(12) United States Patent
Dorsch

(10) Patent No.: US 9,662,634 B2
(45) Date of Patent: May 30, 2017

(54) COMPOSITION OF AND METHOD OF MANUFACTURING AND USING COMPOSITE PELLETS FOR LIQUID SOLIDIFICATION

(71) Applicant: MARTLIN DISTRIBUTING LLC, Valencia, PA (US)

(72) Inventor: Michael G. Dorsch, Valencia, PA (US)

(73) Assignee: Martlin Distributing LLC, Valencia, PA (US)

( * ) Notice: Subject to any disclaimer, the term of this patent is extended or adjusted under 35 U.S.C. 154(b) by 41 days.

(21) Appl. No.: 14/724,845

(22) Filed: May 29, 2015

(65) Prior Publication Data
US 2016/0251918 A1    Sep. 1, 2016

Related U.S. Application Data

(60) Provisional application No. 62/027,314, filed on Jul. 22, 2014.

(51) Int. Cl.
| B01J 20/22 | (2006.01) |
| B01J 20/30 | (2006.01) |
| B01J 20/26 | (2006.01) |

(52) U.S. Cl.
CPC .......... *B01J 20/3007* (2013.01); *B01J 20/22* (2013.01); *B01J 20/261* (2013.01)

(58) Field of Classification Search
CPC ........ E21B 21/066; B01J 20/22; B01J 20/261
See application file for complete search history.

(56) References Cited

U.S. PATENT DOCUMENTS

| 4,217,965 A | 8/1980 | Cremeans |
| 5,147,852 A | 9/1992 | Cowan et al. |
| 5,258,123 A | 11/1993 | Huang et al. |
| 6,076,299 A * | 6/2000 | Spittle .................... C09K 17/52 47/9 |
| 6,148,768 A † | 11/2000 | Ochi |
| 6,360,478 B1 † | 3/2002 | Spittle |
| 6,581,701 B2 | 6/2003 | Heying |
| 6,630,429 B1 | 10/2003 | Cremeans et al. |

(Continued)

FOREIGN PATENT DOCUMENTS

| JP | 60197212 A | * 10/1985 |
| WO | WO2015195747 | † 12/2015 |

OTHER PUBLICATIONS

Upon information and belief, the author is Janici, LLC; Title is Janici, LLC, J-286 Fiber; one page submitted; place of publication is http://janici.com/Products.php; retrieval date Feb. 3, 2016; publication date unknown; publisher unknown.†

(Continued)

*Primary Examiner* — John Kreck
(74) *Attorney, Agent, or Firm* — Reed Smith LLP

(57) ABSTRACT

The composition of, and method of manufacturing and using a composite absorption material for solidifying a waste stream from oil and gas industry drilling operations. The waste stream has a liquid component and is solidified prior to transportation to a landfill. The absorption material is a pelletized composite blend of agricultural fibers and a super-absorbent polymer that has been specifically proportioned to solidify liquids in the waste stream for transport and disposal.

15 Claims, 4 Drawing Sheets

(56) References Cited

U.S. PATENT DOCUMENTS

| | | | |
|---|---|---|---|
| 7,018,955 | B2 | 3/2006 | Schilling et al. |
| 7,629,297 | B2 | 12/2009 | Shaarpour |
| 2007/0015948 | A1 | 1/2007 | Cadieux et al. |
| 2009/0093665 | A1 | 4/2009 | Ross et al. |
| 2010/0063470 | A1* | 3/2010 | Suzuki ............ A61F 13/53 604/367 |
| 2011/0094968 | A1* | 4/2011 | Spittle ............ C02F 1/285 210/666 |
| 2011/0176871 | A1* | 7/2011 | St. Pierre ........ B01J 20/24 405/128.5 |
| 2014/0024561 | A1 | 1/2014 | Reddy |
| 2015/0090933 | A1† | 4/2015 | Morris |

OTHER PUBLICATIONS

Author upon information and belief is M2 Polymer Technologies, Inc.; Title is Radioactive Waste Management—The use of a superabsorbent polymer, such as Waste Lock® 770, in radioactive waste management . . . ; three pages submitted; place of publication is http://www.m2polymer.com/html/radioactive-waste-management.html; publisher unknown; publication date unknown.†

Author upon information and belief is Chagrin River Watershed Partners, Inc.; Title is Wood Mulches & Water Retention Polymer Additives; two pages submitted; place of publication upon information and belief is http://www.crwp.org/files/RD_Tackifier_FactSheet_July2012.pdf; url indicates Jul. 2012, but publication date unknown and retrieval date about Dec. 14, 2015; publisher unknown; publication date unknown.†

\* cited by examiner
† cited by third party

COMPOSITION OF AND METHOD OF MANUFACTURING AND USING COMPOSITE PELLETS FOR LIQUID SOLIDIFICATION

CROSS-REFERENCE TO RELATED APPLICATION

This application claims the benefit under 35 U.S.C. 119 §(e) of the earlier filing date of U.S. Provisional Patent Application No. 62/037,314, filed on Jul. 22, 2014, the entire contents of which are incorporated herein by reference.

BACKGROUND

The present disclosure relates to the composition of and method of manufacturing, a composite absorption material comprising a blend of organic, repurposed and agricultural fibers that have been specifically proportioned and blended to quickly solidify liquids in waste streams for transport and disposal.

The absorption material disclosed herein was specifically developed for the purpose of waste stream solidification resulting from drill cuttings from oil and gas industry drilling operations. Waste streams from such operations contain liquids at a level unacceptable fix disposal at landfill sites so there exists a need for a material or method of solidifying the liquid in the waste streams so that landfills will accept the waste. There is a need to have the liquid in the waste remain solidified as the waste is being transported to the landfill. The vibration during transport can cause drill cutting waste that has been treated with other materials or methods to partially desolidify so that the waste is not accepted by landfills when it reaches the site and must he resolidified. The absorption material disclosed herein fulfill these needs. The absorption material can also be used for applications other than oil and gas production industry, including dredging operations, land fill operations, pipeline and road boring operations and other operations, where liquids need to be solidified in the waste stream or by products of such operations.

BRIEF DESCRIPTION OF THE DRAWINGS

Various embodiments of the invention are described herein in by was of example in conjunction with the following figures, wherein like reference characters designate the same or similar elements.

DETAILED DESCRIPTION

Figure 1A:
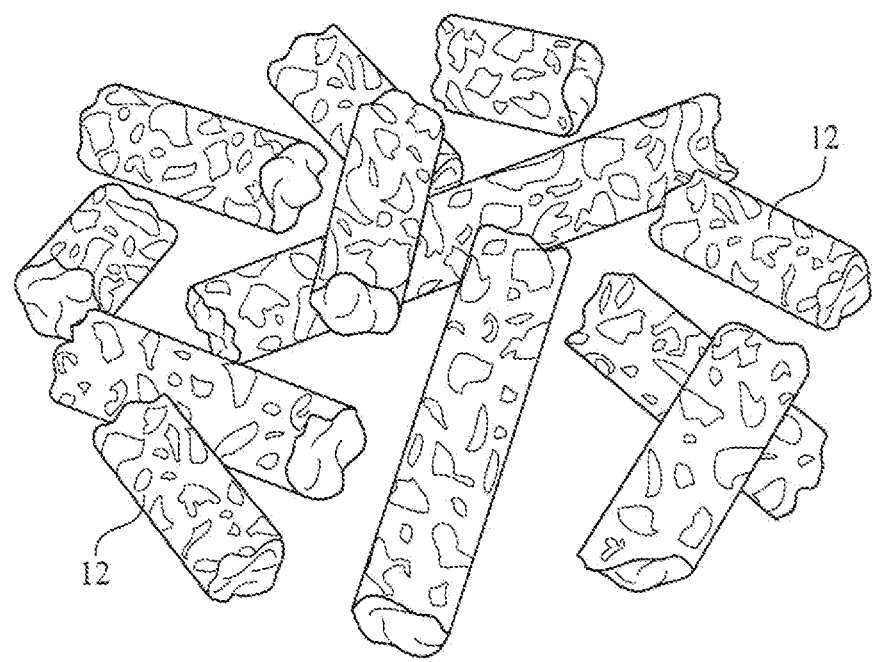
FIG. 1a shows the pellets prior to being run through a crumbling process.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

The composite absorption material 10 disclosed herein is composed of any form of agricultural fibers, including agricultural fibers such as hard wood, soft wood, oat hulls, corn cob, peanut hulls, and grasses, blended with superabsorbent polymers. The superabsorbent polymers can be composed of sodium polyacrylate. The superabsorbent polymers can also be composed of sodium polyacrylamide. The blended ratio used in the absorption material described herein can be between approximately 80% and 98% agriculture fibers by weight and 20% and 2% superabsorbent polymers by weight, respectively. For example, the absorption material 10 disclosed herein can be composed of about 95% by weight hard wood agricultural fiber and 5% by weight sodium polyacrylate superabsorbent polymer.

The absorption material 10 described herein is made into pellets 12 using a large scale, commercial pellet mill where superabsorbent polymer is introduced to the fibers prior to pelletizing by the pellet mill. The superabsorbent polymer is therefore integrated into the fibers as the fibers are compressed into pellets 12. In one embodiment (FIG. 1a), the pellets 12 are approximately 0.25 inch diameter by 1 inch long (6 mm by 25 mm) although larger or smaller pellets can be used. Due to the intense compression of pellets 12 leaving the mill, and customers desiring a product that performs immediately, the pellets are run through a crumbling process that breaks the pellets 12 into a variety of sizes of crumbles 14 (FIG. 1b), the smaller of which work immediately once introduced to a liquid, and the larger crumbles working somewhat slower as the liquid causes them to lose compression and unravel into smaller crumbles. The crumbles or crumbled pellets 14 formed from running pellets 12 through the crumbling process can range in size from a powder consistency to approximately 0.25 inch diameter by 0.75 inch long (6 mm by 18 mm) although larger size crumbles 14 are possible and can be acceptable.

The pellets 12, preferably in the form of crumbles 14, are mixed in with the waste stream 18 containing liquids. Typically, the crumbled pellets 14 are mixed into the waste stream at approximately 5% to 20% of the weight of the waste stream 18, depending on the make-up of the waste stream 18. Typically, the absorption material is added to the waste stream in an amount not exceeding approximately 20% of the weight of the waste stream 18. The crumbled pellets 14 are typically mixed with the waste stream 18 in a contained area or container 20 such as the hopper or a transportable container or mixing bin then loaded onto a truck in which the waste is being transported in to a disposal site. The crumbled pellets 14 act to solidify the liquid in the waste stream 18 as it is being transported such that the dump site will accept the solidified waste stream if it passes the paint filter test.

Figure 1B:
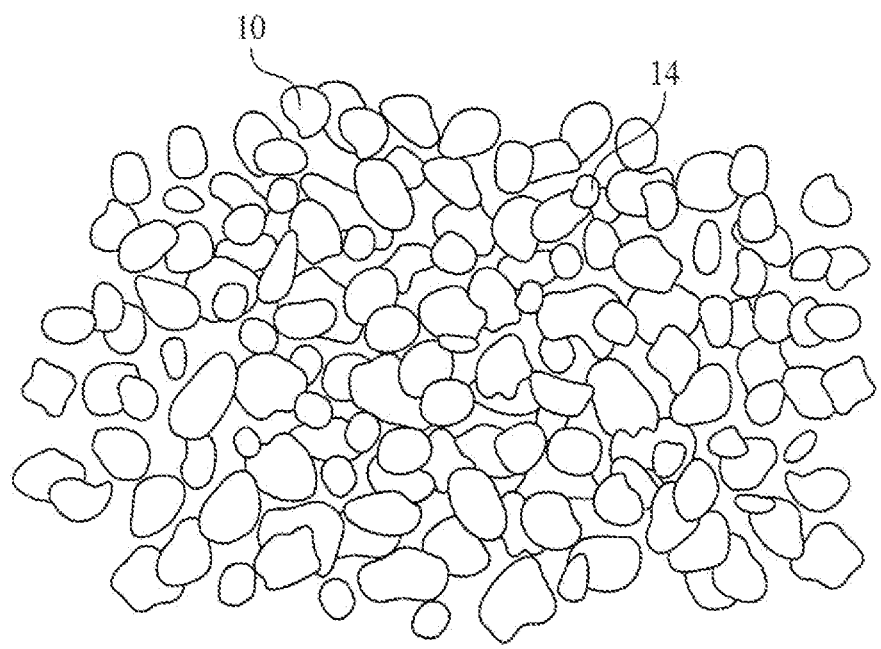
FIG. 1b shows the crumbles or crumbled pelletized absorption material resulting from running the pellets through a crumbling process that breaks the pellets into a variety of sizes of crumbles.
Figure 2:
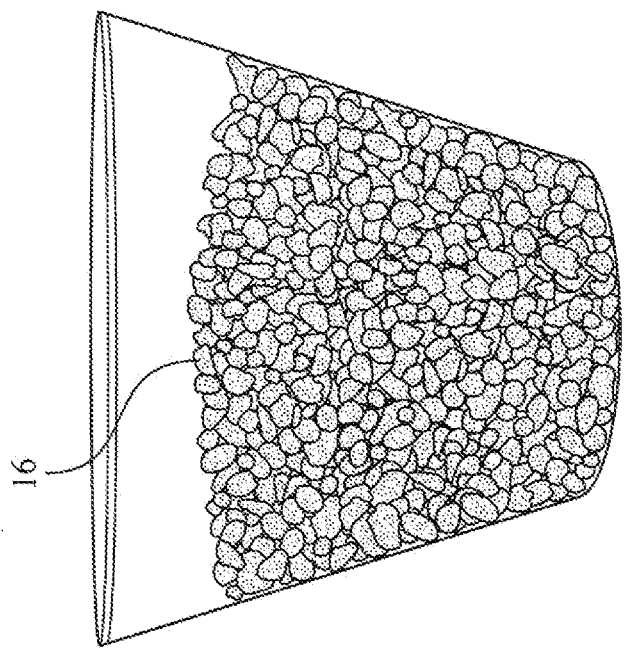
FIG. 2 shows a comparison of the crumbled pellets in a container (on the left) to the crumbled pellets after liquid is added to the container and then solidified due to the action of the crumbled pellets (on the right).
Figure 2:
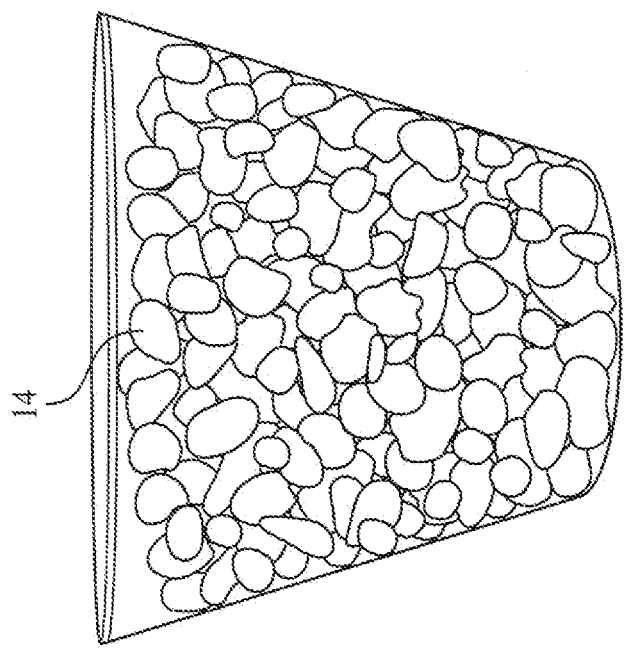
Figure 3:
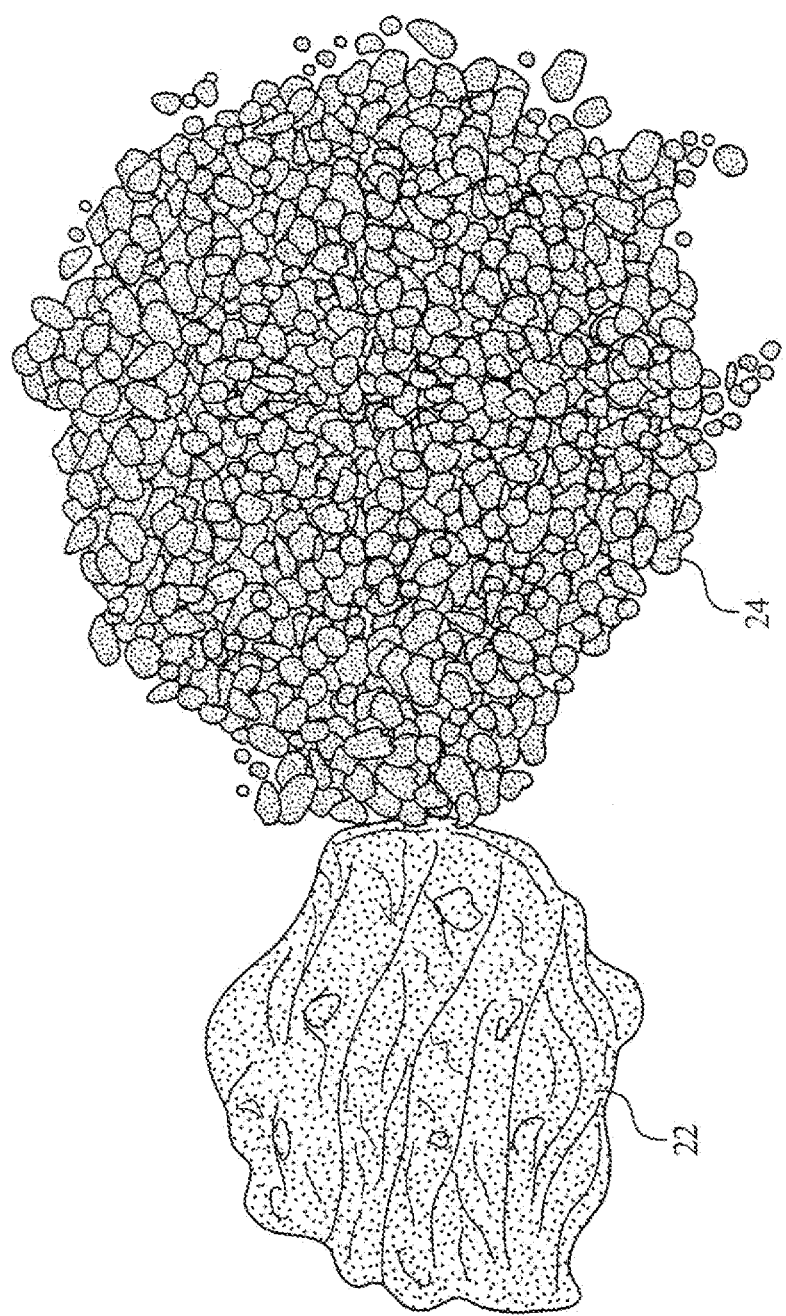
FIG. 3 shows the crumbled pellets mixed with drill cuttings
Figure 4:
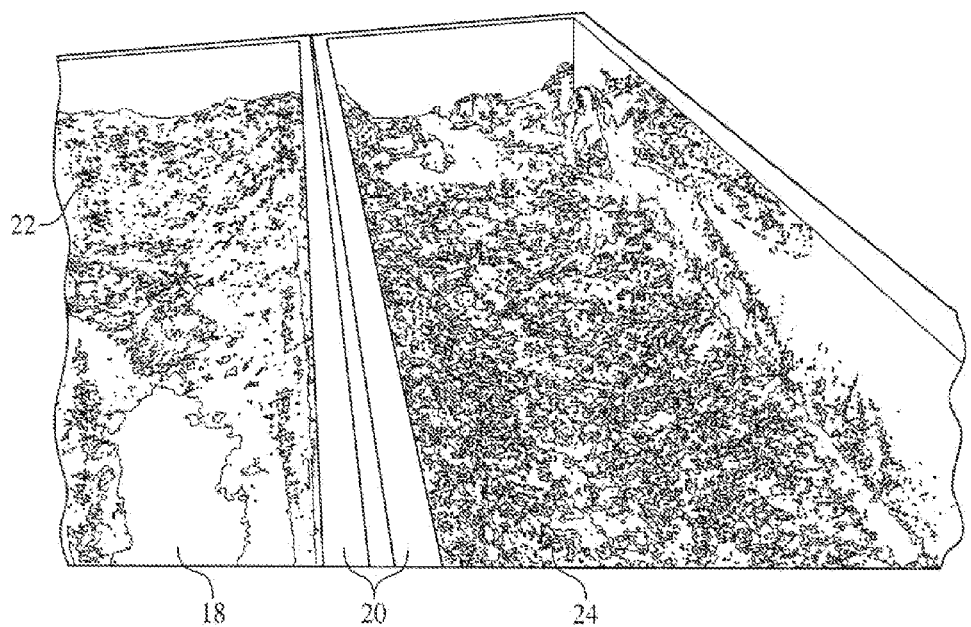
FIG. 4 shows the crumbled pellets being mixed with a waste stream of drill cuttings at a well site.
Figure 5:
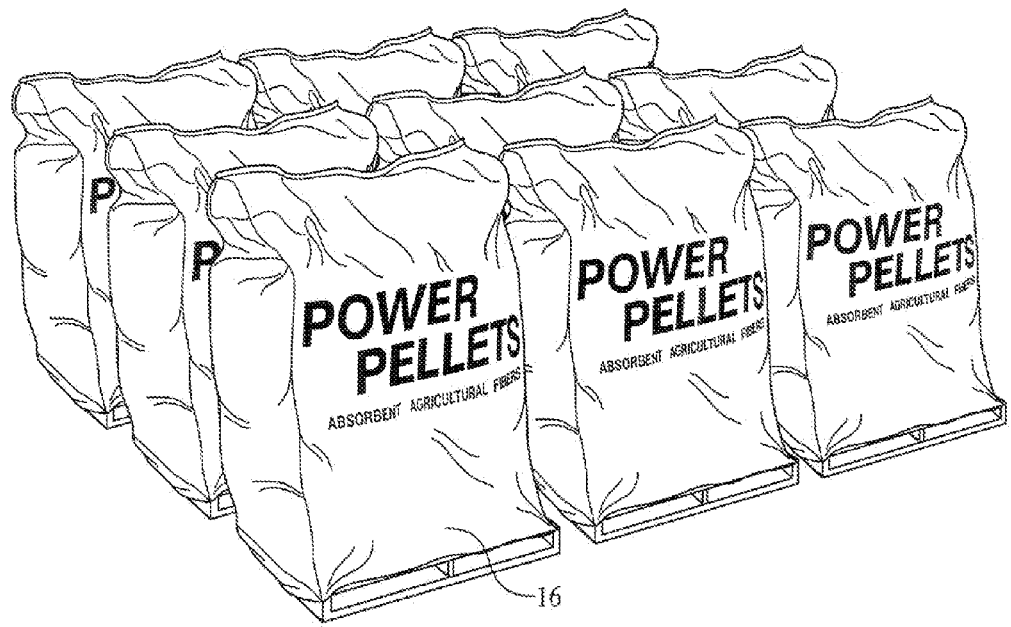
FIG. 5 shows the crumbled pellets in sacks ready for shipment.

Referring to the figures, FIG. 1a shows the pellets 12 prior to being crumbled and FIG. 1b shows the crumbled pellets 14 resulting from running the pellets 12 through the crumbling process that breaks the pellets 12 into a variety of sizes of crumbles 14. FIG. 2 shows a comparison of crumbled pellets 14 in a container (on the left) to crumbled pellets that have absorbed liquid 16 after liquid is added to the container and then solidified due to the action of the crumbled pellets on the right). FIG. 3 shows drill cuttings 22 that may contain liquid waste 18 (on the left) and the mixture 24 of crumbled pellets 14 and drill cuttings 20 that may contain liquid waste 18 after any liquid waste 18 has been absorbed by the crumbled pellets 14 (on the right). FIG. 4 shows the resulting mixture 24 of crumbled pellets 14 mixed with a waste stream comprising liquid waste 18 and solid drill cuttings 22 in a container 20 at a well site on the right a waste stream comprising liquid waste 18 and drill cuttings 22 in a container 20 at a well site on the left prior to introduction of the crumbled pellets 14. FIG. 5 shows crumbled pellets 14 are stored in large sacks 16 for shipment.

The pellets 12 disclosed herein enjoy a substantial advantage over other liquid absorbing pellets and products in terms of performance as measured by a percentage of such pellets and products and by permanent solidification of the liquids in the waste stream. These other pellets and products typically consist of fly ash, sawdust, kiln dust, quick-time, corn cobs and wood pellets, and require, at minimum, a 50% ratio of pellets to waste stream by weight. The pellets described herein are capable of absorbing up to approximately 5 times their weight of liquid, typically within minutes, and are non-selective in performance as to the liquids and waste products on which they are used. Moreover, waste that is solidified using the pellets 12 disclosed herein remains solidified whereas the solidification of waste solidified with other available agents breaks down during transport, under pressure and over time, releasing the liquids that were to have remained solidified.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. An absorption material for the solidification of a waste stream, the absorption material consisting of:
   (a) between approximately 80% and approximately 98% by weight agricultural fibers; and
   (b) between approximately 20% and approximately 2% by weight superabsorbent polymer.

2. The absorption material of claim 1, wherein the agricultural fibers are selected from the group consisting of hard wood, soft wood, oat hulls, and grasses.

3. The absorption material of claim 2, wherein the superabsorbent polymer is selected from the group consisting of sodium polyacrylate and sodium polyacrylamide.

4. The absorption material of claim 1, wherein the absorption material is in the form of pellets.

5. The absorption material of claim 1, wherein the absorption material is in the form of crumbled pellets.

6. The absorption material of claim 5, wherein the crumbled pellets have a size ranging up to approximately 0.25" in diameter by 0.75" in length (6mm by 18mm).

7. A method of solidifying a waste stream having a liquid component, the method comprising:
   adding to the waste stream an absorption material consisting of:
   (a) between approximately 80% and approximately 98% by weight agricultural fibers; and
   (b) between approximately 20% and approximately 2% by weight superabsorbent polymer.

8. The method of claim 7, wherein the absorption material is pelletized.

9. The method of claim 8, wherein the pelletized absorption material is crumbled prior to adding to the waste stream.

10. The method of claim 9, wherein the pelletized absorption material that has been crumbled is added to the waste stream in an amount of from approximately 5% to approximately 20% of the weight of the waste stream.

11. The method of claim 9, wherein the pelletized absorption material that has been crumbled is added to the waste stream in an amount not exceeding approximately 20% of the weight of the waste stream.

12. The method of claim 9, wherein the waste stream is placed in a container prior to the adding of the pelletized absorption material that has been crumbled.

13. The method of claim 9, wherein the waste stream is placed in a container after the adding of the pelletized absorption material that has been crumbled.

14. The method of claim 9, wherein the pelletized absorption material that has been crumbled is mixed with the waste stream and becomes solidified prior to transport of the waste stream to a landfill.

15. The method of claim 9, wherein the waste stream is from oil and gas drilling operations.

* * * * *